March 11, 1952  W. A. WARNER  2,588,595
APPARATUS FOR FACING BUILDING BLOCKS
Filed Sept. 23, 1950  3 Sheets-Sheet 1
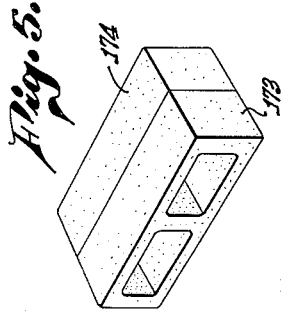
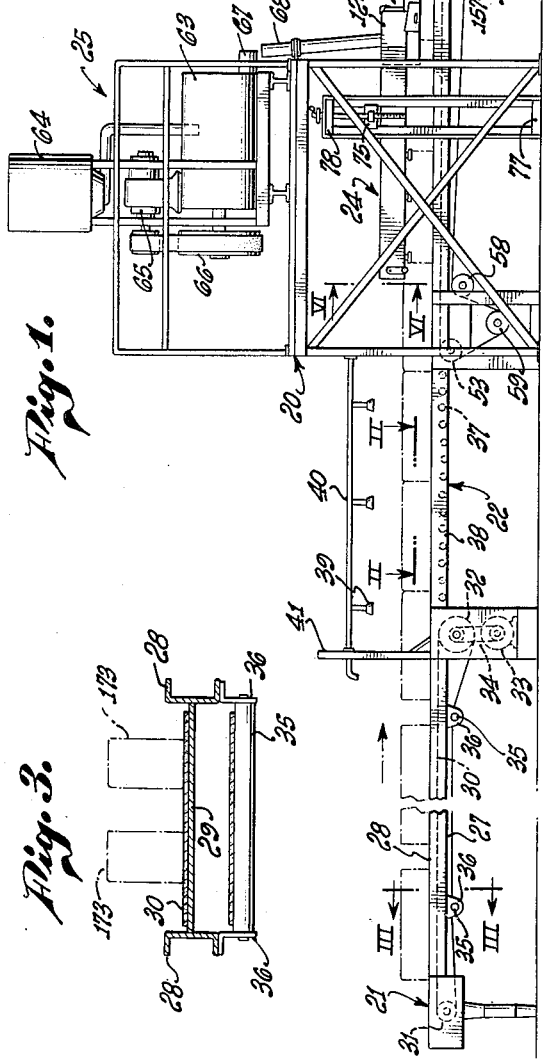
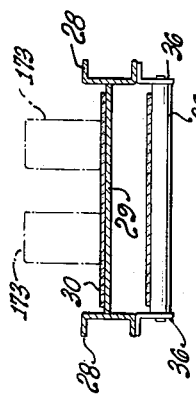
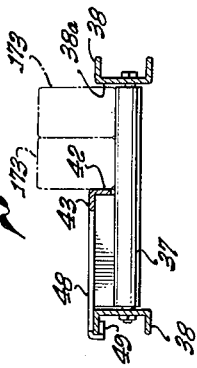
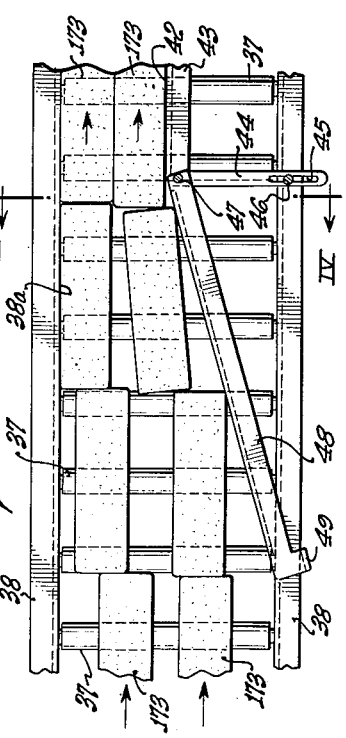
WARREN A. WARNER,
INVENTOR.
BY
ATTORNEY.

March 11, 1952 W. A. WARNER 2,588,595
APPARATUS FOR FACING BUILDING BLOCKS
Filed Sept. 23, 1950 3 Sheets-Sheet 2
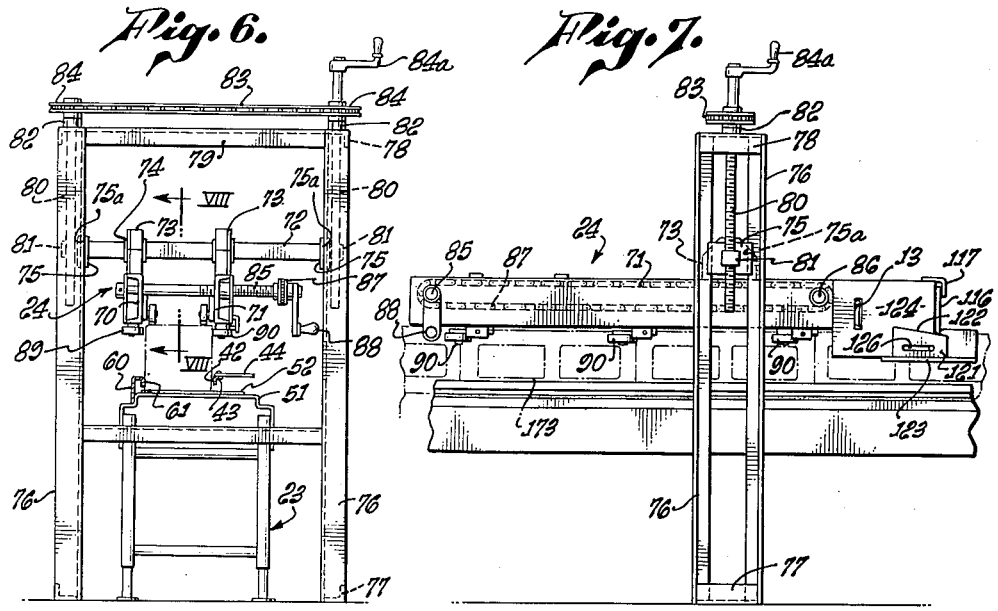
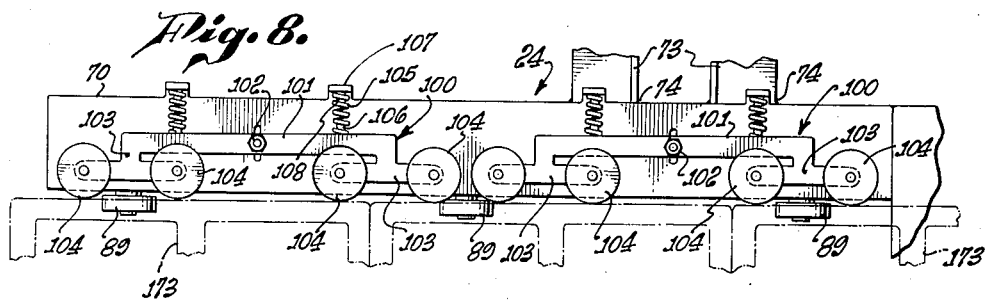
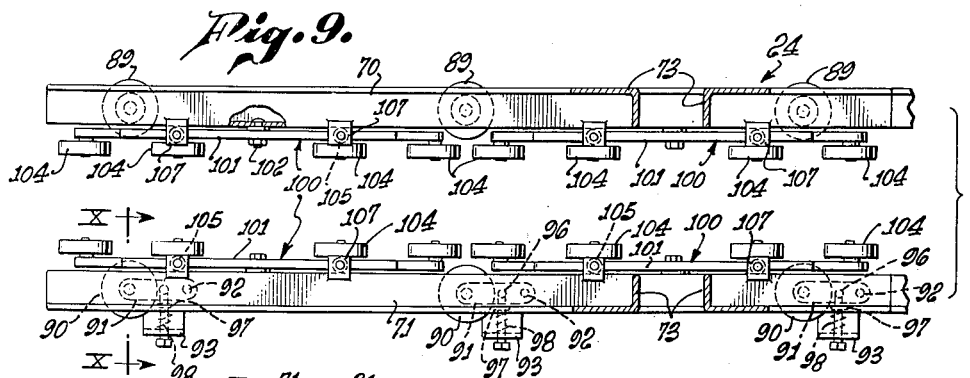
WARREN A. WARNER,
INVENTOR.
BY
ATTORNEY.

March 11, 1952 W. A. WARNER 2,588,595
APPARATUS FOR FACING BUILDING BLOCKS
Filed Sept. 23, 1950 3 Sheets-Sheet 3
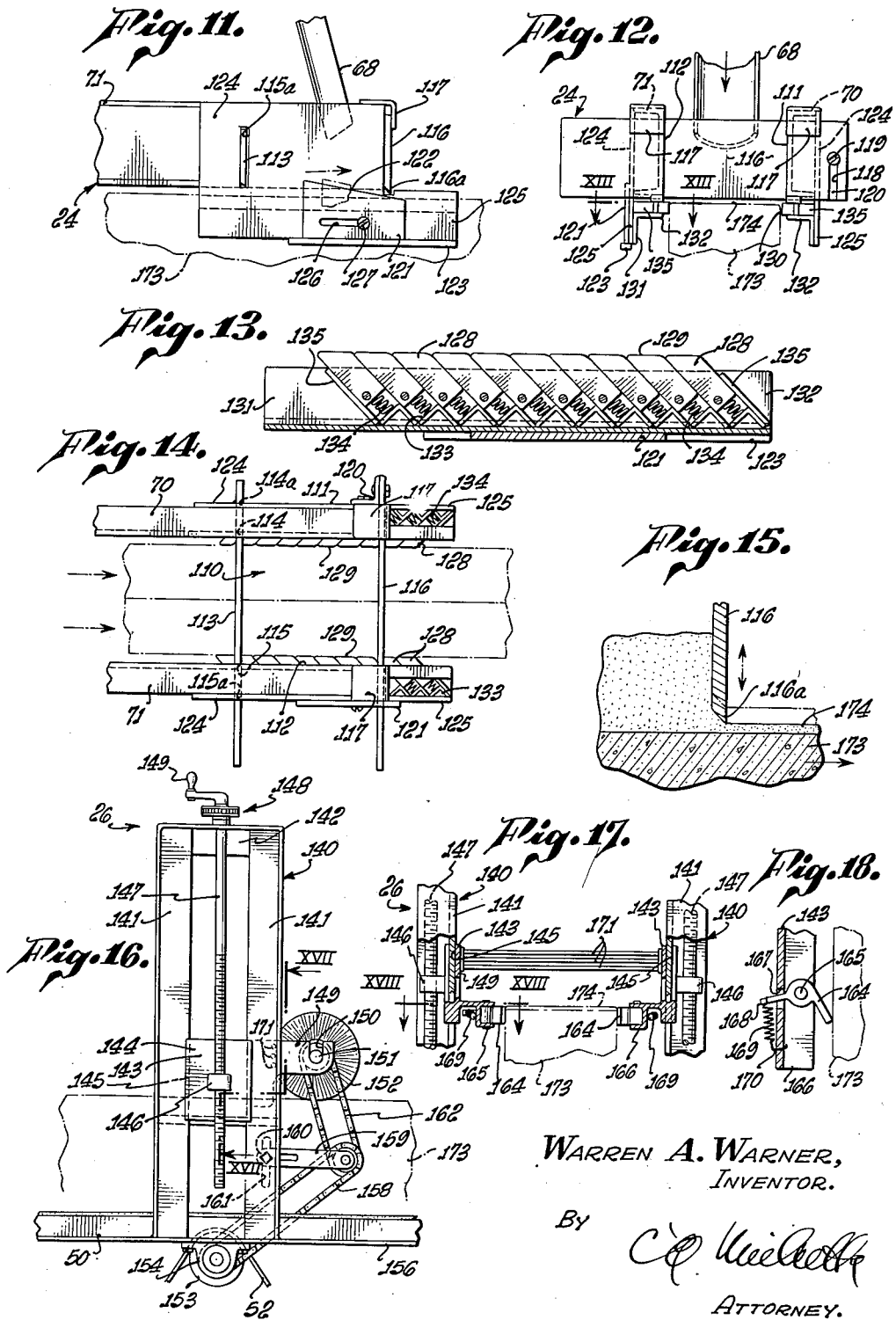
Warren A. Warner,
Inventor.
By
Attorney.

Patented Mar. 11, 1952

2,588,595

UNITED STATES PATENT OFFICE 2,588,595

APPARATUS FOR FACING BUILDING BLOCKS

Warren A. Warner, Los Angeles, Calif., assignor to Art-Block Development Co., Los Angeles, Calif., a corporation of California Application September 23, 1950, Serial No. 186,413

11 Claims. (Cl. 41—1)

This invention relates to an improved apparatus for treating selected surface areas of building blocks. In particular, this invention relates to an apparatus for continuously applying a coating of cementitious composition to a plurality of continuously advancing building blocks for waterproofing and permanently coloring a surface of each block.

When building blocks, which are generally made of a hydraulic cement composition in individual molds, are removed therefrom, their surfaces are rough and unattractive. Such a concrete building block is usually very porous and readily absorbs water. Interior surfaces of a cement block wall, such as a foundation wall, may often become stained and unsightly because of seepage of moisture therethrough. Various waterproofing compounds and compositions applied to such interior surfaces are not entirely satisfactory because the moisture tends to loosen the bond of the waterproofing material to the surface of the concrete block to eventually cause shedding and peeling of the waterproofing material.

The roughness of exposed surfaces of wall structures formed from concrete blocks readily accumulates dirt and dust and soon becomes discolored and unattractive. To obviate this disadvantage, it has been suggested that stucco or paint be applied to the surfaces of walls made of such blocks. Stucco and paint is not entirely satisfactory because after a period of time the stucco may chip or peel, and paint applied to surfaces of the concrete blocks may unevenly fade and assume a mottled appearance. Furthermore application of waterproofing compounds, stucco or paint to erected walls made of concrete blocks must be performed every three or four years and is difficult because adequate preparation of the surfaces of the blocks for receiving these materials is hard to attain and as a result a uniform tenacious bond is not secured between the blocks and the applied material.

This invention contemplates the application of a slurry of cementitious composition to selected surfaces of concrete blocks by means of a continuous process wherein a thin, smooth, uniform, substantially impervious, dense coating or facing is provided on a selected area of each block. Prior proposed devices for applying a thin coating of material to concrete blocks included means for separately coating each block and each block was individually handled. None of the prior devices made commercially possible the continuous application of such a coating to a selected surface of a plurality of blocks arranged in one or more parallel aligned rows in rapid, economical and effective manner.

The primary object of this invention is to design and provide an improved apparatus for continuous application of a smooth surfaced, impervious, dense, uniform coat or facing of cementitious composition to a selected surface area of a plurality of continuously advancing building blocks whereby a weather resistant and waterproof surface is afforded.

An object of this invention is to provide such an apparatus for applying a coating to a selected surface area of a building block wherein the blocks are adequately and uniformly prepared to receive such coating so that a firm secure bond will be provided between the applied coating and the surface of the block.

Another object of this invention is to provide an improved apparatus for applying a coating of cementitious material to selected surfaces of a plurality of building blocks wherein means are provided for maintaining a plurality of rows of blocks in alignment and each block in tight side to side and end to end contact with adjacent blocks.

A further object of this invention is to provide an apparatus as above described having readily adjustable means for handling building blocks of different size, both in width and in depth.

A still further object of this invention is to provide an apparatus as above described, wherein means are provided for spreading or applying a cementitious coating of uniform thickness and smooth exterior surface.

Another object of this invention is to provide a novel spreading device for such an apparatus wherein the spreading device is readily maintained in proper alignment and in selected relation to continuously advancing building blocks.

This invention also contemplates means for providing a stippled surface upon building blocks which have been provided with smooth surfaced coating by the above described apparatus.

Generally speaking, this invention contemplates an apparatus for applying a thin, uniform coat of cementitious composition in the form of a fluid suspension or slurry to a selected surface area of a plurality of building blocks arranged in parallel rows. The building blocks are advanced in a horizontal path of travel by separately driven rear and front conveyor means, the rear conveyor means being driven at a greater rate of speed than the front conveyor means so as to maintain the building blocks in tight endto-end contact during their advancement. As the blocks advance, means are provided for washing and wetting surface areas to which the coating is to be applied for cleaning said areas and for moistening said surfaces to a sufficient depth so as to provide a firm bond when the coating is deposited thereon. Before the coating is applied, the rows of blocks are guided and held in tight side-to-side contact to prevent penetration of the coating between the blocks in said rows. A spreading device is adjustably and selectively mounted above the advancing blocks so as to deposit and smooth out to uniform thickness an application of the coating material. The spreading device is provided with means for preventing flow of the coating material along outer side surfaces of blocks in the outer rows. Immediately after the coating has been applied and before the coating has had sufficient time to set, the blocks are manually separated each from the other and edges of the coating trimmed before the blocks are stored for curing. The invention also contemplates a device for stippling the surface of the coating deposited on a block.

Other objects and advantages of this invention will be apparent from the following description of the drawings.

In the drawings:

Fig. 1 is a general side view of an apparatus embodying this invention.

Fig. 2 is a fragmentary top plan view taken from a horizontal plane indicated by the line II—II of Fig. 1.

Fig. 3 is a vertical transverse sectional view taken in the plane indicated by line III—III of Fig. 1.

Fig. 4 is a vertical transverse sectional view taken in the plane indicated by line IV—IV of Fig. 2.

Fig. 5 is a perspective view of a pair of building blocks having a coating applied to one surface thereof by the apparatus of this invention.

Fig. 6 is a vertical sectional view taken from the plane indicated by the line VI—VI of Fig. 1 showing an end view of a spreader device employed in the apparatus embodying this invention.

Fig. 7 is an enlarged fragmentary side view of the spreader device shown in Fig. 6.

Fig. 8 is a fragmentary view taken in a vertical longitudinal plane indicated by the line VIII—VIII of Fig. 6.

Fig. 9 is a fragmentary enlarged top plan view of the spreader device shown in Fig. 7.

Fig. 10 is a fragmentary enlarged sectional view taken in the line indicated by line X—X of Fig. 9.

Fig. 11 is an enlarged fragmentary side view of the front end of the spreader device shown in Fig. 7.

Fig. 12 is an enlarged fragmentary front view of Fig. 11.

Fig. 13 is an enlarged fragmentary sectional view taken in the horizontal plane indicated by line XIII—XIII of Fig. 12.

Fig. 14 is an enlarged fragmentary top plan view of the front end of the spreader shown in Fig. 11.

Fig. 15 is an enlarged fragmentary sectional view of the gate provided in the front end of the spreader device.

Fig. 16 is a fragmentary side view of a stippling device shown at the front end of the machine in Fig. 1.

Fig. 17 is a fragmentary enlarged view of the stippling device shown in Fig. 16 and taken in vertical transverse planes indicated by line XVII—XVII of Fig. 16.

Fig. 18 is an enlarged fragmentary sectional view taken in a plane indicated by line XVIII—XVIII in Fig. 17.

Referring particularly to Fig. 1, an apparatus embodying this invention is shown therein and comprises generally a supporting structure generally indicated at 20, a conveyor means including a rear driven conveyor 21, an intermediate idle conveyor 22, and a front driven conveyor 23. A spreading device, generally indicated at 24, is carried by the supporting structure 20 over a rear portion of the front conveyor 23, said spreading device being adapted to receive a slurry of cementitious composition from a slurry mixing means generally indicated at 25 carried by the supporting structure 20 above spreader 24. Forwardly of spreader 24 may be provided a stippling device indicated in its entirety at 26. The apparatus is so arranged that building blocks may be manually placed on rear conveyor 21 and progressively advanced in aligned rows over the intermediate conveyor 22 and the front conveyor 23.

The rear conveyor 21 comprises a conveyor frame 27 including a pair of horizontal, spaced, parallel, outwardly directed channel members 28, said channel members being connected intermediate their top and bottom faces by a horizontal transverse rigid bed 29. The bed 29 provides a support for the upper lay of an endless flexible belt 30. The belt 30 is supported at opposite ends by end rollers 31 and 32, said roller 32 being driven by a motor 33 through a suitable drive diagrammatically indicated at 34. The lower lay of belt 30 may be suitably supported upon a pair of spaced rollers 35 journalled in depending brackets 36 suitably secured to the channels 28.

The intermediate idle conveyor 22 is positioned in alignment with conveyor 21 and may comprise a plurality of spaced transverse idle rollers 37 journaled in spaced longitudinal members 38 aligned with channels 28. The top edges of rollers 37 lie in substantially the same horizontal plane as the top lay of the endless belt 30 and are likewise carried intermediate the top and bottom edges of members 38 whereby an upper longitudinally extending edge margin of one member 38 may provide a guiding surface 38a for the lower portion of building blocks advanced along conveyor 22.

The intermediate conveyor 22 is thus formed so as to provide a conveyor portion wherein building blocks may be suitably washed, cleaned and moistened by means of water spray ejected from a plurality of longitudinally spaced nozzles 39 carried above conveyor 22. The nozzles 39 are connected in well-known manner to a longitudinally extending pipe 40 supported at one end by an upstanding frame member 41 and suitably connected at its other end (not shown) to a pipe connected to a water source. A valve (not shown) may be provided for opening and closing the supply of water to the nozzles 39.

At the forward portion of conveyor 22 may be provided a laterally adjustable longitudinally extending bar 43 of angle section having a guide face 42 for holding and guiding the building blocks in alignment as they travel from conveyor 22 and along conveyor 23. The bar 43 is suitably carried by longitudinally spaced arms 44, each being provided with a slot 45 cooperable with upstanding securing bolts 46 provided on the adjacent member 38 and the aligned member of conveyor 23 for lateral adjustment. Pivotally connected to bar 43 as at 47 is one end of a horizontal diagonal adjustable guide member 48, said member 48 being provided at its opposite end with a downwardly and inwardly turned flange 49 for cooperable slidable engagement with the top flange of member 38 for positioning guide member 48, depending upon the extent to which guide bar 43 is inwardly or outwardly positioned. The guide member 48 serves to urge building blocks diagonally toward the fixed guiding surface 38a provided on the opposed member 38. The bar 43 is positioned depending upon the width of building blocks to be surfaced and the number of rows of aligned building blocks to be simultaneously treated so as to maintain the rows of aligned blocks in side-to-side contact along their lower portions.

The conveyor 23 comprises a conveyor frame 50 also including a fixed horizontal bed 51 extending between side members of the conveyor for supporting the upper lay of a flexible endless belt 52 in the same horizontal plane as that of the upper lay of endless belt 30 of conveyor 21, said bed 51 extending the entire length of conveyor 23 to provide a firm support thereafter. The belt 51 is supported by end rolls 53 and 54, said end roll 54 being suitably connected by well-known drive means diagrammatically indicated at 55 to a motor 56. The lower lay of the belt is supported by a lower roller 57 adjacent end roll 54 and diagonally spaced rollers 58 and 59 adjacent end roll 53. The lower lay passes over roller 58 and beneath roller 59 which may be mounted for vertical adjustment for increasing or decreasing tension in the endless belt as desired. The lower lay of belt 51 also provides driving means for stippler device 26 in a manner to be described hereinafter.

The bed 51 includes a longitudinally extending fixed side guide member 60 provided with an inner guide surface 61 in alignment with guide surface 38a formed on the aligned member 38 thereby providing throughout the length of conveyors 21, 22 and 23 a fixed guide surface means along which one side of an outer row of aligned blocks may slidably engage while advancing for maintaining proper alignment. The guide bar 43 also extends in parallel relation to member 60 for holding the blocks in side-to-side contact for approximately the length of conveyor 23. If desired, the guide surface 61 and guide face 42 may be composed of edges of rotatable elements such as wheels or rollers for reducing friction.

The cementitious composition contemplated by this invention for providing a dense impervous surface or coating for concrete blocks may comprise in fluid suspension or slurry a neat Portland cement mixture including a selected mineral oxide for providing a desired color. This cementitious composition may be suitably prepared in carefully controlled batches by the mixing means indicated at 25 which may comprise a pair of mixing tanks 63 supplied by water from a tank 64, said tank 64 having suitable gauge means to accurately indicate the amount of water discharged into each tank in order to provide a selected mixture. Each tank 63 is provided with interior agitator means such as paddles or blades (not shown), which may be driven by a motor 65 through suitable drive means 66. Each mixing tank is provided with a valved outlet 67 of well-known form arranged to discharge into a chute 68 or other suitable slurry-conducting means for conveying slurry to the forward portion of the spreading device 24.

The spreading device 24 provides means for applying a thin uniform coating, of about 0.25 inches thick for example, of cementitious composition to top surfaces of rows of aligned blocks as the blocks advance beneath the spreading device 24. The spreading device 24 comprises a pair of elongated, longitudinally extending, spaced parallel outwardly directed channel section members 70 and 71. Each member 70 and 71 is suspended intermediate its ends from a transverse beam 72 of square cross section, each member being provided with spaced upstanding columns 73 interconnected at their top portions and providing openings of generally square shape for loosely receiving the beam 72. The member 70 is positioned virtually above the fixed lower guide 60 and is held against lateral movement at 74 by any suitable means such as removable stops on beam 72 on opposite sides of columns 73, said stops permitting limited swinging motion of member 70. The member 71 is mounted for lateral movement along beam 72 to vary the spacing of members 70 and 71 as later described.

A guide plate 75 is carried on each end of beam 72, each plate 75 having vertical grooves 75a in side edges thereof slidably cooperable with vertical inner edge margins of a pair of spaced upstanding standards 76. Each pair of standards 76 are interconnected by top and bottom members 77 and 78 and the pairs on opposite sides of conveyor 23 may be interconnected by a top transverse member 79.

Means for vertically adjusting spreader 24 is provided by a pair of vertical threaded rods 80 extending downwardly between members 76, each rod having threaded connection with an extension of beam 72 as at 81. The rods 80 may be suitably journaled adjacent the top of members 76 by bearings 82. Rods 80 are arranged to be turned in unison by means of a transverse endless chain 83 engaging sprockets 84 carried on the top end of each rod 80, one of said rods 80 being provided with a crank handle 84a. When handle 84a is turned beam 72 is raised or lowered as desired to position the spreader 24 in selected vertical position with respect to building blocks to be treated.

Means for laterally adjusting spreading device 24 in relation to the number of rows of blocks to be treated comprises a pair of horizontal transverse spaced shafts 85 and 86 journaled in member 70 and provide threaded engagement with member 71. Each shaft 85 and 86 extends beyond member 71 and is provided adjacent the end of said extension with sprockets which are connected by a longitudinally extending chain 87. A crank handle 88 may be provided on shaft 85 whereby turning of said handle 88 will cause member 71 to move laterally inwardly or outwardly along the threaded connection with shafts 85 and 86 and in parallel spaced relation to the member 70.

Means for holding the upper portions of aligned rows of blocks in side-to-side contact while permitting yieldable limited floating movement of spreader 24 on said blocks are carried by each member 70 and 71. Member 70 is provided with a plurality of spaced anti-friction means including spaced wheels 89 mounted for rotation about a vertical axis and carried below the lower flange of channel member 70. The inner peripheral margin of each wheel extends inwardly of the plane of the web of channel member 70 for rolling contact with the upper side margin of adjacent blocks when positioned against the fixed guide surface 60.

The member 71 is provided with a plurality of spaced anti-friction means including spring-biased wheels 90 carried below the lower flange of channel member 71 and in the same horizontal plane as wheels 89. Each wheel 90 is mounted for rotation about a vertical axis and is supported at one end of a longitudinaly extending arm 91 pivotally connected at its opposite end at 92 to member 71. Member 71 is provided with an outwardly and downwardly extending bracket 93 provided with a port 94 for receiving a bolt 95 threadedly connected at 96 to arm 91 intermediate its ends. The bolt is provided with an annular shoulder 97 affording a seat for one end of a coil spring 98, the other end of said spring being seated against the inner surface of the bracket 93. The spring 98 biases said arm and wheel 90 carried thereby inwardly for yieldable pressure contact against upper side margins of an adjacent row of blocks.

The spreading device 24 is adapted to be supported for yieldable limited vertical motion on outer top edge portions of outer rows of blocks by means of a plurality of spaced rotatable supporting anti-friction assemblies 100 carried by each member 70 and 71. Each assembly 100 includes a longitudinally extending equalizer beam 101 having a vertically adjustable connection 102 intermediate its ends to the web of a respective channel member 70 and 71. Each end of beam 101 is provided with a depending horizontal member 103 carried in spaced relation below beam 101. Each end of member 103 carries a wheel 104 mounted for rotation about a horizontal axis transverse to spreader means 24, the lower peripheral portion of said wheel extending below the bottom edge of the associated members 70 and 71.

Each end of equalizer beam 101 is spring-biased downwardly by means of coil spring 105, the lower end of each spring 105 being positioned by an upstanding boss 106 carried by beam 101 between pivotal connection 102 and an end of the beam. Each member 70 and 71 is provided with spaced horizontally inwardly extending spring caps 107, each cap 107 being provided with a depending boss 108 for positioning the upper end of a spring 105. The assemblies 100 thus permit the spreader 24 to normally maintain parallel relation to the top surface of advancing blocks to be coated even though the top surfaces may be slightly irregular in vertical dimension.

The front end of spreader 24 carries side panels 124 each secured as by welding to edges of flanges of the respective members 70 and 71. Each panel 124 includes a portion 125 extending below members 70 and 71 and projecting forwardly thereof.

Between panels 124 is provided an enclosure 110 for receiving and holding a supply of slurry of cementitious composition continuously deposited therein by the chute 68 when the apparatus is in operation. Enclosure 110 includes side walls 111 and 112 formed by webs of respective members 70 and 71. A rear wall 113 extends transversely between side walls 111 and 112, said rear wall extending through aligned vertical slots 114 and 114a in the web of member 70 and panel 124 respectively and secured to the panel in any suitabe manner as by welding. The rear wall 113 likewise extends through aligned vertical slots 115 and 115a provided respectively in the web of member 71 and associated panel 124 and projects therebeyond. The rear wall 113 is slidable within slots 115 and 115a for permitting lateral movement of member 71 by the lateral adjusting means heretofore described.

At the forward edge of each member 70 and 71 is provided a verticaly adjustable transverse gate 116 having a bottom beveled edge 116a, said gate being held in vertical position by a forwardly and downwardly extending pair of brackets 117 overlying upper outer marginal portions of gate 116 while affording limited vertical movement thereof. The gate 116 projects slightly outwardly beyond member 70, said projection being provided with a vertical open-ended slot 118 for receiving a securing bolt and nut assembly 119 which engages an angle bracket 120 secured to the associated panel 124, said slot 118 permitting vertical adjustment of this side of gate 116.

Means for adjusting gate 116 in selected vertical position includes a vertically disposed flat plate 121 having a top inclined edge 122, said plate 121 being slidably carried on a horizontal ledge 123 formed on a lower edge of the associated portion 125 of a panel 124. A slot 126 and a securing screw 127 extending through said slot for threaded engagement with panel 124 serves to hold the gate adjusting plate 121 in selected position.

The enclosure 110 is provided with a bottom opening to permit deposit of slurry held therein with selected surface areas of blocks to be coated. The bottom opening of enclosure 110 is partially closed by a plurality of rearwardly directed, spring-loaded fingers 128, said fingers 128 being provided with inner beveled edges 129 adapted to slide as at 130 along upper side margins of adjacent advancing building blocks, the top surface of each finger 128 lying in a horizontal plane spaced above the horizontal plane defined by the top surface of said blocks. Fingers 128 within the enclosure serve to partially close the bottom opening of enc'osure 110 so as to prevent slurry held in the enclosure from flowing downwardly along sides of the blocks.

The fingers 128 are carried by longitudinally extending members 131 of angle section secured to panels 124 beneath the lower edge of each member 70 and 71. A horizontally extending portion 132 of each angle member 131 provides a surface for associated fingers 128 upon which fingers 128 may slide. Each horizontal portion 132 is provided with a plurality of diagonally arranged wall sections 133 each affording a seat for one end of an associated spring 134, the other end of said spring being seated against the adjacent end of a finger 128. The fingers 128 are maintained in tight abutting parallel relation on the horizontal portion 132 by means of diagonal end walls 135.

As best seen in Fig. 14, the angle members 131 project forwardly beyond the gate 116 so that the most forward of fingers 128 will be disposed outside of enclosure 110 and serve to trim or wipe outer side edges of the uniform coating applied to the top surfaces of the blocks.

When the spreading device 24 is in proper vertical and lateral adjustment it will be noted that the spreader rides on the advancing rows of blocks and embraces top portions of a plurality of said advancing blocks by means of the assemblies 100 and the horizontally disposed wheels 89 and 90 respectively. Since the spreader is vertically supported in loose relationship with the square beam 72, the spreading device is provided a certain amount of vertical play while being held in longitudinal alignment with rows of blocks by the wheels 89 and inwardly biased wheels 90 which embrace top portions of said blocks. This manner of suspending the spreading device 24 permits the device to readily adjust itself to minor irregularities in width and height of the advancing blocks while spreading a virtually uniform thickness of coating on the top of said blocks.

The stippling device generally indicated at 26 is spaced forwardly of the spreader means 24 and may be employed when it is desired to provide a stippled finish on the normally smooth finished surface of the coating applied to the blocks.

The stippling device 26 comprises a pair of upstanding standards 140, each standard including a pair of parallel angle section members 141 secured at their lower ends to the frame of the front conveyor means 23 and at their top ends by an inter-connecting beam 142. The inner edges of each pair of members 141 provide vertical guide means for a brush carrier means 143, said carrier means 143 having a rectangular portion 144 provided with vertical grooves 145 along opposite side edges for slidable engagement with the opposed inner edges of members 141. Each portion 144 includes an outwardly extending threaded collar 146 for threaded engagement with a vertical shaft 147. The shafts 147 carried by standards 140 are operably connected across their top by a chain and sprocket means generally indicated at 148 for moving the brush carrier means 143 on opposite sides of the conveyor in unison. A crank 149 may be suitably connected to one of the shafts 147 for manipulation of the vertical adjustment of the brush carrier members 143.

Each brush carrier member 143 includes a forwardly extending portion 149 provided with a vertically disposed slot 150 for journably receiving an end of a shaft 151 upon which is mounted a cylindrical stiff bristled brush 152.

Means for rotating the brush 152 so that its peripheral speed will be virtually the same as the linear speed of belt 52 of the front conveyor 23 may comprise a drive roller 153 journably carried by suitable brackets 154 beneath the top frame member 156 of conveyor means 23. On each side of drive roller 153 may be provided rollers 157 (Fig. 1) so arranged that the belt 52 passes beneath rollers 157 and over drive roller 153. The roller 153 drives through a sprocket carried on its supporting shaft, a forwardly and upwardly extending chain 158 which engages a sprocket carried by a vertically adjustable and longitudinally extensible supporting arm 159. The arm 159 is connected at one end to a member 141 by a bolt and nut assembly 160 vertically slidable within a vertical slot 161.

The shaft carrying the sprocket at the end of arm 159 carries in adjacent relation a second sprocket which engages a chain 162 extending diagonally upwardly and rearwardly for engagement with a sprocket carried on shaft 151 of the brush 152.

The diameter of the various sprockets is so selected that the drive roller 153 transmits to the cylindrical brush a peripheral speed which is virtually identical to the linear speed of the belt 52. Slippage of ends of bristles on the brush in contact with the surface of the coating is thus virtually eliminated and a neat stippled finish is provided.

Each brush carrier means 143 may be provided with an inwardly extending spring-biased finger 164 pivotally mounted at 165 on an inward extension bracket 166 carried by the member 143. The bracket 166 may be provided with an aperture 167 through which lever element 168 extends, one end of said element 168 being integrally formed on finger 167 at an angle thereto and the other end of said element 168 providing connection to one end of a coil spring 169. The other end of spring 169 may be suitably secured to means 143 as at 170. The fingers 164 provide means for holding top portions of rows of blocks in alignment as they pass through the stippling device and also serve to wipe side edges of the coating applied to the top surface of the blocks since the stippling brush tends to spread said coating laterally outwardly.

Rearwardly of brush 152 may be provided a plurality of spaced transversely extending wires 171 for cleaning tips of the brush bristles as the brush rotates. The material wiped from the bristles by the cleaning wires 171 may fall upon the coating inasmuch as the stippling brush provides a rough stippled surface. The wires 171 may be secured in any convenient manner to each member 143.

In operation, building blocks which have first been moistened by sprinkling may be placed in generally aligned rows upon the rear conveyor 21 for advancement through the machine. As the blocks advance onto idle conveyor 22 they are further cleaned by washing and further moistened so as to suitably prepare the top surface of each block for application of the slurry of cementitious coating. As the blocks advance from idle conveyor 22 they are guided into side-to-side contact by guide member 48 and the guide surface 42 provided on the bar 43. The driven conveyor 21 is operated at a greater rate of speed than driven conveyor 23 so as to push said blocks into end-to-end contact, said end-to-end contact being maintained throughout the length of forward conveyor 23. As the advancing blocks pass beneath the spreading device 24 the top portions are held in close side-to-side contact by means of the wheels 89 and inwardly spring-biased wheels 90. A controlled quantity of cementitious slurry is introduced into the enclosure 110 so that as the blocks pass beneath the bottom opening thereof, the edge of gate 116 uniformly spreads and presses the slurry downwardly into contact with the top surface of the blocks. The knife edge of gate 116 provides a smooth finish on the slurry as the blocks emerge from beneath the forward end of the spreader device. Side edges of the blocks are trimmed by forward fingers 128.

When the blocks advance beyond conveyor 23 they are transferred to an idle conveyor 172 (Fig. 1) constructed similarly to idle conveyor 22. Conveyor 172 which comprises a plurality of transversely extending and longitudinally spaced rollers tends to cause aligned rows of blocks to slightly separate and thus breaks the cementitious coating along the central line of contact between a pair of aligned rows. This breaking occurs before slurry has had sufficient time to set and normally the edges along the break are smooth enough so as not to require additional trimming. An operator positioned along the idle conveyor forwardly of front conveyor 23 further separates the blocks from their end-to-end contact. Since this is accomplished before the slurry has had sufficient time to set, normally the end edges of the applied coating do not require manual trimming. The coated blocks may then be removed from the idle conveyor and stored for curing.

In Fig. 5 is shown a pair of building blocks 173 provided with a smooth surfaced coating 174 of cementitious composition. Obviously, the building blocks to be surfaced may be of solid, hollow, or interlocking type.

Building blocks provided with a cementitious coating of uniform thickness as described above are not only impervious to moisture but are also provided a firm and tenacious bond to the blocks. Such a cementitious coating may be readily cleaned by simply hosing off the coated face of the blocks with water. The smooth finished surface afforded by this coating does not tend to accumulate dust and dirt which normally discolor exposed faces of building blocks. Since the cementitious coating is provided with permanent coloring matter, the color of the coating provided on building blocks surfaced by the apparatus of this invention do not fade, discolor, or later present a mottled appearance.

The manner of mounting the spreading device should be particularly noted in that it provides a means for spreading a uniform coating on building blocks even though there may be irregularities in the height and width of said blocks. This result is accomplished because of the particular construction of the spreading device wherein the rotatable supporting assemblies 100 contact a plurality of said blocks and are yieldable to equalize the position of the spreader above the top surface of the blocks. In addition the spreading device is permitted slight yieldable lateral adjustment to compensate for irregularities in width by means of the wheels 90 which are yieldably mounted for limited lateral movement.

It is understood that various modifications and changes may be made in the arrangement of conveyor means in the manner of supporting the spreading device and in the manner of driving a stippling device. All such modifications and changes coming within the scope of the appended claims are embraced thereby.

I claim:

1. In an apparatus for continuous application of a colored cementitious coating to selected surface areas of advancing rows of the aligned building blocks, the combination of: means for advancing a plurality of rows of aligned blocks in a horizontal plane including independently driven rear and front conveyor means; said rear conveyor means being driven at a greater rate of speed than the front conveyor means for maintaining aligned advancing blocks in end-to-end contact; means including a fixed longitudinally extending guide surface and a cooperable laterally adjustable spaced parallel guide face provided along the front conveyor means for maintaining said advancing blocks in side-to-side contact; a frame structure; means for spreading a slurry of cementitious composition on a selected surface area of said blocks; said spreading means being carried by said structure above said advancing blocks and comprising elongated parallel members provided with spaced means antifrictionally engaging a plurality of said advancing blocks; an enclosure at the front end of the spreading means for receiving and holding a supply of said slurry in contact with advancing blocks; said enclosure including an adjustable gate for forming a selected thickness of coating on said blocks while advancing beneath said enclosure.

2. An apparatus as defined in claim 1 wherein said anti-friction means along one side of said spreading means are in yieldable pressure contact with upper outer side margins of an outer row of advancing blocks.

3. An apparatus as defined in claim 1 wherein anti-friction means along one upper and outer side margin are spring-biased into contact therewith.

4. An apparatus as defined in claim 1 wherein one of said parallel members is held against lateral movement and the other of said parallel members is laterally adjustable with respect to the said one of said members.

5. An apparatus as defined in claim 1 wherein a plurality of rearwardly directed spring-biased fingers beneath side walls of the enclosure slidably and yieldably embrace outer edge margins of rows of said advancing blocks.

6. In an apparatus for treating a selected surface of a plurality of continuously advancing concrete building blocks arranged in an aligned row, the provision of: a supporting structure; and spreader means adjustably carried by said structure comprising a pair of spaced parallel elongated members, one of said members having spaced anti-friction means held against lateral movement adapted to engage upper and outer side margins of advancing blocks adjacent thereto, the other member having spaced laterally adjustable anti-friction means having spaced laterally adjustable anti-friction means adapted to engage opposite upper and outer side margins of advancing blocks adjacent thereto; a plurality of spaced rotatable supporting means carried by each member for engagement with top outer edge margins of said blocks; a forward enclosure carried by said members and provided with top and bottom openings and a vertically adjustable gate; and a plurality of parallel spring-biased diagonally rearwardly directed fingers in abutting relation partially closing the bottom opening of the enclosure for sliding engagement with upper side margins of said blocks.

7. An apparatus as defined in claim 6 wherein means are provided for lateral adjustment of one of said members.

8. An apparatus as defined in claim 6 wherein means are provided for raising and lowering the spreader means.

9. An apparatus as defined in claim 6 wherein the rotatable supporting means carried by each member include spring means biasing said supporting means downwardly.

10. In an apparatus for continuous application of colored cementitious coating to selected surface areas of an advancing row of aligned building blocks, the combination of: means for advancing a row of aligned blocks in a horizontal plane including individually driven rear and front conveyor means, said rear conveyor means being driven at a greater rate of speed than the front conveyor means, said front conveyor means including an endless belt; means including a fixed longitudinally extending guide surface along one side of said front conveyor means and a cooperable laterally adjustable guide face in spaced parallel relation to said guide surface; a frame structure; means for spreading a slurry of cementitious composition on the top surface area of said blocks, said spreading means being carried by said structure above said advancing blocks in alignment therewith and comprising parallel members provided with longitudinally spaced means anti-frictionally and yieldably embracing upper portions of a plurality of adjacent blocks; an enclosure at the front end of said members for receiving and holding a supply of said slurry in contact with the selected surface area of said advancing blocks; a vertically adjustable gate forming the front wall of said enclosure for forming a selected thickness of coating on said blocks; stippling means forwardly of said enclosure and including a rotatably driven cylindrical brush means for contacting the surface of said coating; and means driven by the belt of the front conveyor means for rotating said brush means at a rate of speed correlated to the rate of travel of the belt.

11. In an apparatus for applying a colored cementitious coating to selected surface areas of an advancing row of aligned building blocks including a conveyor means having an endless belt and a spreading means for depositing a uniform coating of cementitious composition on said surface areas, the combination of: stippling means spaced forwardly of said spreading means and including a vertically adjustable support member provided with journals; a cylindrical brush means carried in said journals for contacting the surface of said coating; and means cooperable with said endless belt for rotating said brush means at a peripheral rate of speed virtually the same as the linear rate of travel of the belt.

WARREN A. WARNER.

REFERENCES CITED

The following references are of record in the file of this patent:

UNITED STATES PATENTS

| Number | Name | Date |
|---|---|---|
| 1,256,757 | Wilberg | Feb. 19, 1918 |
| 2,299,326 | Kiehn | Oct. 20, 1942 |
| 2,329,378 | Kuehner | Sept. 14, 1943 |
| 2,504,205 | King | Apr. 18, 1950 |